E. P. MALONE.
NUT LOCK.
APPLICATION FILED JAN. 3, 1920.

1,367,615.

Patented Feb. 8, 1921.

WITNESS:

INVENTOR.
E. P. MALONE
BY
ATTORNEY.

UNITED STATES PATENT OFFICE.

EDWARD P. MALONE, OF MANCHESTER, IOWA.

NUT-LOCK.

1,367,615.                    Specification of Letters Patent.         Patented Feb. 8, 1921.

Application filed January 3, 1920. Serial No. 349,263.

*To all whom it may concern:*

Be it known that I, EDWARD P. MALONE, a citizen of the United States, residing at Manchester, in the county of Delaware and State of Iowa, have invented certain new and useful Improvements in Nut-Locks; and I do hereby declare the following to be a full, clear, and exact description of the invention, such as will enable others skilled in the art to which it appertains to make and use the same.

This invention relates to nut locks and aims to provide a novel and improved, yet extremely simple and effective means for holding a nut on a bolt against accidental loosening or unscrewing thereof.

A further object is the provision of a lock nut constructed in a novel manner to pinch or grip the bolt and means for maintaining such hold of the nut on the bolt.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1:
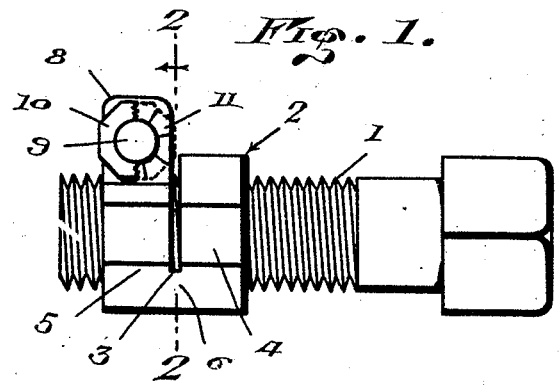
Figure 1 is a side elevation of the nut on the bolt, a portion of the pinch clamp nut being broken away.
Figure 2:
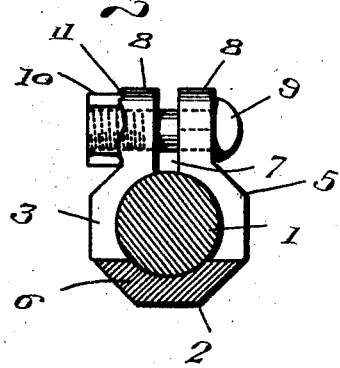
Fig. 2 is a cross section on the line 2—2 of Fig. 1.

Referring particularly to Figs. 1 and 2, there is shown a threaded bolt 1 on which the nut 2 is screw threaded, said nut being of any suitably polygonal form for the engagement of wrench.

In carrying out the invention, the nut 2 has a kerf or slit 3 cut therein, at right angles to the axis of the nut and extending from one side to a point near the opposite side, thereby dividing the nut into the inner and outer portions 4 and 5, respectively, connected by a web 6, whereby the portions 4 and 5 will turn as a unit. The portion 4 is solid, while the portion 5 is split or divided, as at 7, opposite to the web 2, with apertured ears 8 outstanding from the ends of the portion 5 to provide a pinch clamp. The portion 5 is thus resilient to embrace the bolt, and a pinch clamp bolt 9 extends through the ears 8 and has a nut 10 threaded thereon, whereby, when the bolt 9, and nut 10, are tightened, this will force the ears 8 toward one another, to contract the resilient portion 5 of the nut on the bolt. This will retain the nut on the bolt against accidental loosening or unscrewing of said nut, and the adjacent sides of said nut 10 and corresponding ear 8 have radial corrugations or teeth 11 to interengage and prevent the nut 10 from unscrewing. The nut 2 has the advantage of a solid portion 4 threaded on the bolt, and a pinch clamp portion also threaded on the bolt and adapted to tightly clamp or grip the bolt to prevent the nut loosening by vibration or other causes. The nut 10, like the nut 2, can be of any suitable polygonal outline, and the ears 8 are spaced apart sufficiently to permit them to move together for tightly binding the portion 5, especially the ends thereof, on the bolt.

Figure 4:
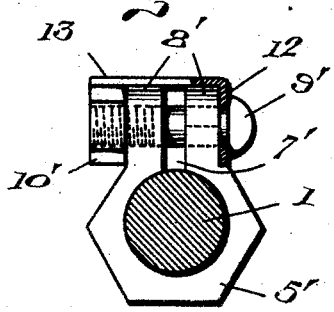
Fig. 4 is a section on the line 4—4 of Fig. 3, showing the portion of the retaining spring in section.
Figure 3:
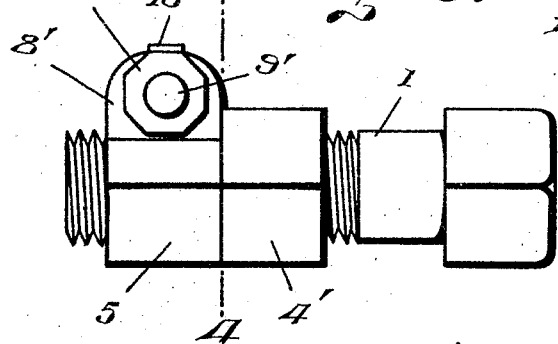
Fig. 3 is a view similar to Fig. 1 of a modified form.

In the modified form shown in Figs. 3 and 4, an inner main nut 4' is used, resembling the portion 4 of the nut 2, and an outer lock nut 5' is used resembling the portion 5 of said nut 2 above described, the nuts 4' and 5' being independent instead of united as in the form above described. The nut 5' is split or divided, as at 7', and has the outstanding apertured ears 8' at its ends receiving a pinch clamp bolt 9' on which a nut 10' is threaded, whereby the nut 5' can be contracted to embrace the bolt 1 with a pinch fit, thereby preventing the nut 4' from unscrewing.

A further modification is depicted in Figs. 3 and 4, in that the nut 10' is retained in place by means other than the corrugations or teeth 11 above described. Thus, a washer 12 is clamped against that ear 8' opposite to the nut 10' under the head of the bolt, and has a leaf spring 13 extending at right angles across the edges of the ears 8' with its free portion overlapping the nut 10' and bearing against one side thereof. As the nut 10' is rotated, the spring 13 will spring over the corners of the nut, and will prevent the accidental turning of the nut 10'.

Figure 5:
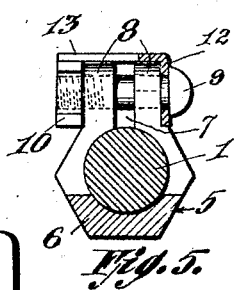
Fig. 5 is a section similar to Fig. 2 showing the use of the retaining spring as in Fig. 4.

However, the corrugations 11 can be used in the modified form or the spring 13 can be used on the first form instead of the corrugations 11. Thus, as shown in Fig. 5, the retaining spring is used on the form of nut shown in Figs. 1 and 2, instead of the corrugations or teeth.

Having thus described the invention, what is claimed as new is:—

1. A lock nut having a slit extending from one side at an angle to the axis providing two portions connected by a web at the opposite side, one of said portions being split opposite to said web and having outstanding ears, a bolt extending through said ears, a nut on said bolt bearing against one ear, and means between the last named nut and one of the ears for preventing the accidental turning of said nut.

2. A lock nut split at one side and having outstanding ears, a bolt extending through said ears, a nut threaded on the bolt to bear against one ear, and a washer held by the bolt against the other ear and having a leaf spring extending at an angle across the edges of the ears to overlap the last named nut and prevent accidental turning thereof.

In testimony whereof I have signed my name to this specification in the presence of two subscribing witnesses.

EDWARD P. MALONE.

Witnesses:
 HUBERT CARR,
 E. M. CARR.